Feb. 7, 1967 R. K. WILMER 3,302,829
RANDOM ACCESS FILM STRIP STORAGE SYSTEM UTILIZING PNEUMATIC SELECTION AND MECHANICAL TRANSPORT MEANS
Filed Sept. 14, 1964 3 Sheets-Sheet 1

INVENTOR
RICHARD K. WILMER

BY [signature]
ATTORNEY

Feb. 7, 1967 R. K. WILMER 3,302,829

RANDOM ACCESS FILM STRIP STORAGE SYSTEM UTILIZING PNEUMATIC SELECTION AND MECHANICAL TRANSPORT MEANS

Filed Sept. 14, 1964 3 Sheets-Sheet 2

3,302,829
Patented Feb. 7, 1967

3,302,829

RANDOM ACCESS FILM STRIP STORAGE SYSTEM UTILIZING PNEUMATIC SELECTION AND MECHANCAL TRANSPORT MEANS

Richard K. Wilmer, Yorktown Heights, N.Y., assignor to International Business Machines Corporation, New York, N.Y., a corporation of New York Filed Sept. 14, 1964, Ser. No. 396,340
15 Claims. (Cl. 221—88)

The present invention relates to apparatus for the random storing and accessing of any one of a plurality of elongated film storage strips. More particularly, it relates to such apparatus utilizing pneumatic means to select such strips from storage and hold same during transport to and from the read-write apparatus and mechanical means to physically transport same to and from storage.

In present day computing systems, many types of storage systems or memories are conventionally used for storing information, which memories must be recurrently called upon and used by the computer in solving various scientific or business problems. These memories fall into two general areas. These are the internal and external storage variety. The internal memory is the computer working memory which must be highly accessible and fast but usually does not require an overly large capacity. The other type is the external storage which must often store many millions of words but need not be instantaneously avaliable in its entirety.

The most common type of internal memory used within a computer system is, of course, the magnetic core storage type into which information may be read in and read out in extremely short periods of time. Such core memories also have the feature of being completely randomly addressable. In other words, any word location in the memory may be addressed directly. The more common external storage systems utilized in present day computers comprise paper tape and magnetic tape, disc or drum storage systems. The magnetic tape type is the most prevalent in present day computers. However, in the case of a large, continuous magnetic tape, to access a particular area within the tape may take a considerable amount of time before the tape can be physically unwound until the desired address is found and the information stored thereon read out. Therefore, the obvious limitation of the serial or magnetic tape memory is the relatively long period of time required to access a desired portion of said tape. Other memories have been developed falling in between the long serial type of memory, such as the magnetic drum or disc and the magnetic core memory, which latter is completely randomly addressable. In these latter types of memories the individual drums or discs are not capable of storing nearly so much information as a single tape; however, a plurality of discs or drums are used and mechanical means are provided for selecting a given disc or drum and further, for selecting a desired track on the surface of said storage medium.

Most of these latter systems are termed as being randomly accessible or addressable inasmuch as it is possible to address relatively small segments of data within the relatively large memory, i.e., a particular track on a disc or on a drum. However, both of these systems suffer from the difficulty of being quite complicated mechanically and thus, expensive to build for a given quantity of storage since they require very precise head positioning and drive synchronizing systems.

A recent entry in the computer storage field has been the use of film strips or segments on the order of between one and two feet in length and several inches in width containing a plurality of information tracks. This type of storage strip has been used in both optical storage systems and also magnetic storage systems and in operation, requires the locating of a desired strip from the system storage bin, transporting said strip to a reading location and subsequently returning same to its original spot. Existing methods of selecting a particular strip have involved, for example, the use of a very large drum wherein the strips were stored in a direction parallel with the axis thereof and accessed out of the flat face of said drum, said face being substantially perpendicular to the axis thereof. The actual fetching mechanism of such systems has comprised rotating and translating the drum to reach a particular area, physically picking up a film strip by means of a mechanical picker, carrying same to a reading location, transferring the strip to a reading mechanism and subsequently returning the strip to the drum by the same slow mechanical process. These prior art systems for accessing and storing such film strips have been both expensive and also extremely slow due to the necessity of actually moving mechanical parts over considerable distances.

It has now been found that a very efficient high speed film strip storage system may be constructed utilizing pneumatic means for selecting a desired record strip from a suitable multiposition storage bin and utilizing mechanical means for physically transporting the selected strip to a reading location, returning same again to said storage location and finally, selecting the proper return storage location by pneumatic means. The system utilizes a rapidly rotating transporting armature together with a stationary multi-chute storage bin. As the armature rapidly scans the storage locations, selection of a particular storage chute is accomplished by pneumatic means, which means renders the armature capable of withdrawing a particular strip from storage and of subsequently returning same to storage after a read-write operation.

It should be clearly understood that in previous descriptions and in all descriptions which follow, the use of the term "film" is not intended to limit the invention to a photographic or optical process but that such film is intended to refer to any sort of a thin flexible record strip such as a segment of magnetic tape or ribbon upon which information may be suitably stored.

It is accordingly a primary object of the present invention to provide a high speed combination pneumatic and mechanical storage and accessing system for a plurality of film strips.

It is yet another object of the invention to provide such a system wherein the film is accessed, maintained in position on a suitable read-write drum and a subsequent storage location selected by purely pneumatic means and the transporting of the film strip to and from said storage location is accomplished by mechanical means.

It is a further object of the invention to provide such a system wherein pneumatic means are provided for accurately braking said film when it is returned to its storage location.

It is a further object of the invention to provide such a system which is ideally suited to modularization wherein a large number of the individual storage systems may be grouped together and operated by common control apparatus.

It is still another object to maintain the strip accessing armature at a constant velocity. Accelerating type mechanisms require great power, complicated controlling mechanism and are very susceptible to wear.

Other objects, features and advantages of the invention will be apparent from the following more particular description of a preferred embodiment of the invention, as illustrated in the accompanying drawings.

Figure 1:
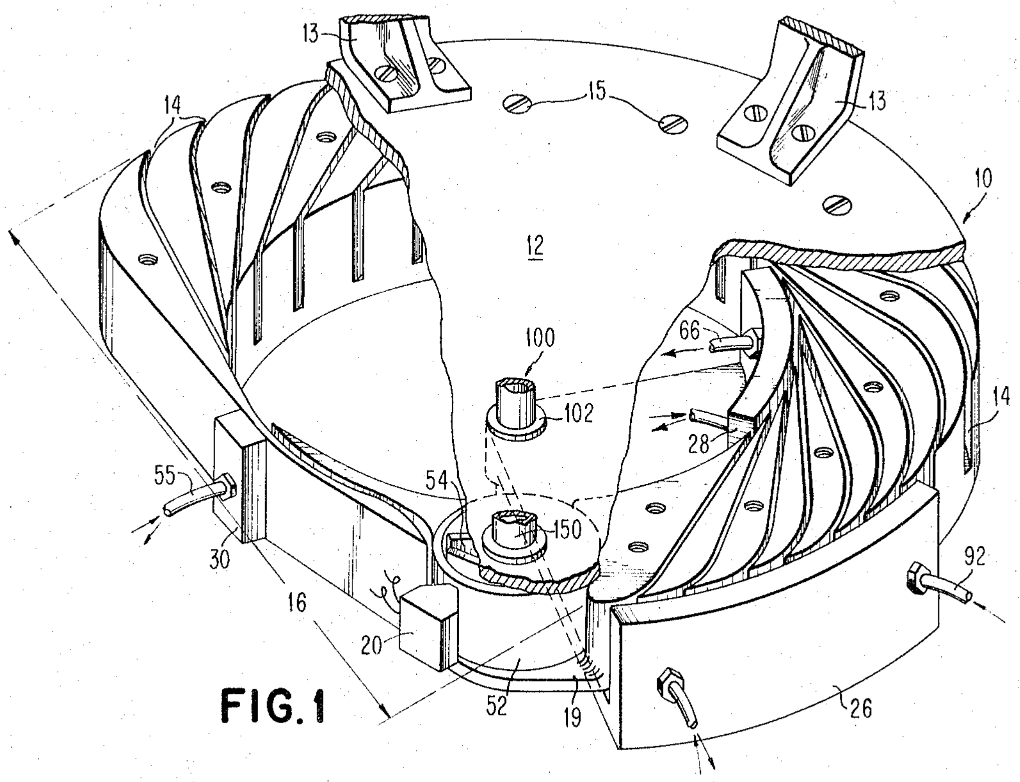
FIGURE 1 is a perspective view of a random access storage system constructed in accordance with the present invention wherein a portion of the storage bin is cut away to expose the film strip storage chutes.

The objects of the present invention are accomplished in general by a film strip storage system comprising a multiple storage location bin having a plurality of individual strip storage chutes therein, said bin being of substantially arcuate shape wherein the inner and outer extremities of said storage chutes lie within inner and outer concentric cylinders respectively, and wherein said storage chutes are curved so that the chute is substantially tangent to the outer cylindrical surface of said storage bin at its outer end and substantially tangent to the inner cylindrical surface of said storage bin at its inner end. Rotary shoes are provided for rotation adjacent to the inner and outer cylindrical surfaces of said bin which have means thereon for pneumatically withdrawing a selected strip from a selected storage chute upon command and for transporting same around the outer periphery of said storage bin. A read-write drum means is located substantially tangent to an extension of the outer cylindrical surface of said storage bin and means are provided cooperative with said read-write drum for fixedly supporting a film strip on the surface thereof. A return chute is located between said read-write drum and said inner surface of said arcuate storage bin and means are provided for transferring a strip from said read-write drum to said return chute means. Inner rotary shoe means are provided for extracting a strip from said return chute and for transferring same to a selected input slot of a selected storage chute. Means are also provided for causing the leading edge of a strip to be separated from said inner armature means and cause same to enter said selected storage chute.

By means of the present invention a combination pneumatic and mechanical film strip storage system is achieved. The individual strips are stored in a multi-position cylindrical storage bin assembly having an open center section. The inner and outer surfaces of this hollow storage bin contain slots which are the input and withdrawal openings respectively of strip storage chutes. A rotatable armature is located within the drum assembly coaxial therewith which has an inner shoe rotatable in close proximity to the inner cylindrical surface of said bin and a second outer shoe rotatable in close proximity to the outer cylindrical bin surface. The inner shoe is used to transport a film strip from the read-write drum location and return the strip to a storage chute while the other shoe is used to select a particular strip from the storage bin and transport same to said read-write drum location. As stated previously, a particular film strip is extracted from the storage drum by suitable pneumatic means, i.e., combinations of vacuum and air pressure, and is caused to adhere to the outer transport shoe by strictly pneumatic means. The actual transport operation per se, i.e., when the strip is affixed to the shoe, is accomplished by the mechanical motion of said shoe about the outer cylindrical bin surface which carries the film strip to the read-write drum. Similarly, when a strip is ejected from the read-write drum, it is picked up from a suitable return chute by the inner shoe assembly and is caused to transfer and adhere to the shoe surface by pneumatic means and is finally returned to a selected storage chute by purely pneumatic means when the inner shoe reaches a predetermined position with respect to a selected storage chute. Thus, it may be seen that the present system utilizes a combination of pneumatic means and mechanical means to access and store film strips in the present system.

The operation of the present system will be apparent from the following more particular description of the system with reference to the accompanying drawings.

Referring now particularly to FIGURE 1, there is shown, in perspective form, an operating embodiment of a film strip accessing and storage system constructed in accordance with the teachings of the present invention. In the figure, reference numeral 10 illustrates the actual storage bin assembly. It will be noted that the cover 12 of the bin assembly is shown partially broken away to expose the individual storage chutes 14. As stated previously, the inner and outer cylindrical surfaces of the storage bin 10 define a hollow cylinder having film strip storage chutes 14 located between said inner and outer surfaces. An important consideration of the design of these chutes is that at both the inner and outer extremities thereof they are substantially tangent to said inner and outer surfaces of said storage bin. This is to allow for the smooth and rapid removal of the film strips from said chutes and subsequent return thereto with minimum interference against the sides of said chutes.

The brackets 13 shown affixed to the cover member 12 serve the purpose of supporting the entire assembly as the storage bin 10 is fixedly secured to said cover member by suitable fasteners 15. The transport armature 24 and read-write drum means 18 are also supported thereby as is more clearly shown in FIGURES 3 and 4. It will also be noted that the shafts driving the read-write drum means 18 as well as the armature means 24 are shown as broken away since, as will be illustrated with respect to FIGURES 3 and 4, the read-write means and armature means are supported by the cover member 12 and when the cover member 12 is removed, the read-write means also is withdrawn from the remainder of the apparatus as a unit. As indicated, this structure will be apparent from the description of FIGURE 3 and 4 wherein the cover member 12 is shown as the principal support for the read-write and armature drive means.

The actual bin assembly is illustrated as though it were cast from a plastic material such as Bakelite, styrene or some other convenient molding compound. However, it is obvious that a person skilled in the art could fabricate the storage bin from many different materials such as, for example, sheet metal stock.

It will further be noted that in the area designated by the numeral 16, the storage bin is discontinuous insofar as the location of storage chutes is concerned. This is to accommodate the read-write drum means 18 having a multiple read-write head assembly 20 mounted adjacent thereto and the return chute 22 which serves the purpose of receiving a film strip when it is initially removed from said read-write drum means. As will be more apparent in the cross-sectional drawing of FIGURE 2, the structure of the assembly in area 16 of FIGURE 1 is such that the rotation of the outer shoe 26 of the armature assembly 24 is not interferred with. As stated previously, the outer shoe 26 serves the function of receiving a film strip extracted from a storage chute 14 and transports same to the read-write drum 18. The inner shoe 28 serves the function of removing a strip from the return chute 22 and returning it to one of the storage chutes 14. Other interrelated functions of these two shoes with the use of the various pressure and vacuum sources supplied thereto for the purpose of braking a film strip or returning same to a storage chute and also for specifically selecting and accessing a film strip in a particular chute will be explained more particularly with reference to the subsequent figures.

It should also be noted that the manifolds and the solenoid valves for supplying air and vacuum to the various plenums on the shoes 26 and 28 are not shown in FIGURE 1 for purposes of clarity. These valves are shown in the drawing of FIGURE 2 as their particular connections to the various vacuum and pressure plenums on the inner and outer shoes 26 and 28 are more clearly apparent in the cross-sectional diagram of this figure.

It will be noted in FIGURE 1 that arrows are shown going into the various pipe connections on the inner and outer shoes 26 and 28, the return chute braking and ejection platen 30 and the two inputs to the read-write drum means 18. An arrow pointing into such pipes indicates that a pressure is supplied to the associated element and an arrow pointing away from said pipe indicates that a vacuum is maintained through said pipe. The bi-directionl arrows are intended to indicate that at various sequential times during the operation of the device either a pressure or a vacuum may be supplied to that particular element. The timing of these pneumatic means will be set forth more clearly subsequently with respect to FIGURE 2 and the timing charts of FIGURE 5.

Figure 2:
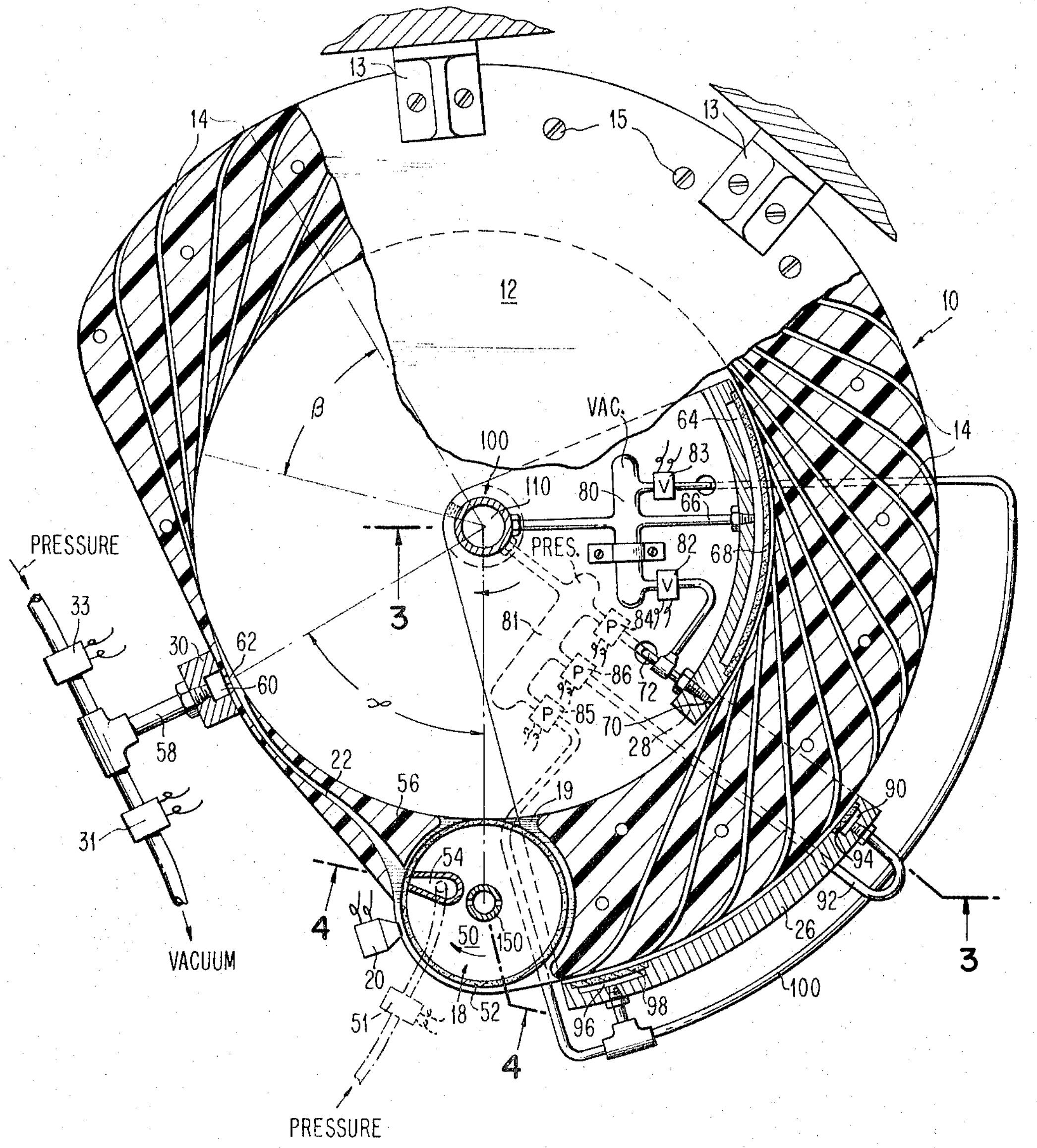
FIGURE 2 is a cross-section of the storage system of FIGURE 1.

Referring now specifically to FIGURE 2, there is shown a cross-section of the storage device of FIGURE 1 taken substantially through the center of said apparatus. In this view, all of the significant portions of the device are clearly shown including the storage chutes 14, the read-write means 18 including the vacuum chamber 50 and the pressure ejection member 54. Also, the return chute 22 and the details of the vacuum and pressure platens on the outer and inner shoes 26 and 28 are clearly shown. It should first be noted that the read-write drum means 18 is so situated that its outer surface is substantially coincident with an extension of the outer cylindrical surface of the storage bin assembly 10. This is so that as the outer transport shoe 26 carries a strip to this drum there will be a smooth transition as the film strip is transferred to the drum surface. Although in the present drawing the read-write drum 18 is also shown as substantially co-extensive with an extension of the inner surface, this latter condition is not necessary since there is no specific relationship to the surface of the drum in the inner storage bin surface. It is only necessary that the drum must not be any larger than that shown in the drawing as it would interfere with the traversal of the inner shoe 28 as the armature 24 is rotated.

All of the reference numerals utilized in FIGURE 1 refer to the same elements in FIGURE 2. Having thus generally indicated the principle segments of the mechanical system, i.e., the storage bin 10, the rotating armature 24 with its inner and outer shoes 26 and 28 respectively, the read-write drum means 18 and the return chute 22, the pneumatic system will now be generally described. Beginning first with the read-write drum means 18, the general structure of this drum is that an evacuated plenum or chamber 50 is provided within the drum and a porous drum surface 52 is utilized to support the film strip as it is received on the surface of the drum. As will be evident, creating a vacuum within the chamber 50 causes a pressure due to air flow through the porous material to be exerted on the outer surface 52 of the drum. This pressure will hold a film strip applied to the surface of said drum securely against said drum throughout any read-write operation which it is desired to perform.

Figures 3, 4:
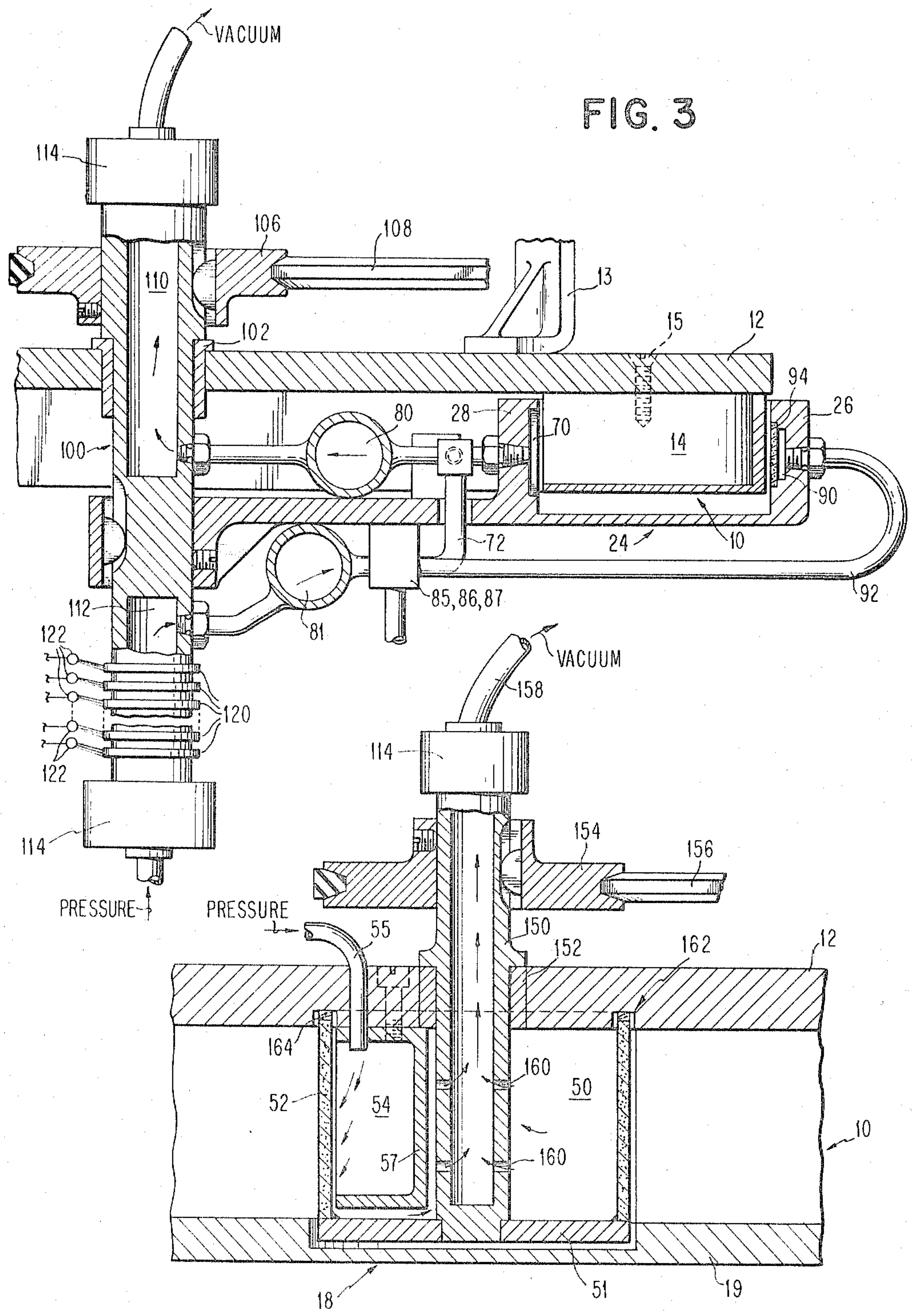
FIGURE 3 is a cross-sectional view of the rotating armature taken along line 3—3 of FIGURE 2.
FIGURE 4 is a cross-sectional view of the read-write drum taken along line 4—4 of FIGURE 2.

When it is desired to remove a strip from the drum, an air pressure is supplied to the chamber 54 which is fixedly mounted within the rotary drum structure as will be evident from the subsequent description of FIGURE 4. The introduction of an air pressure into this chamber 54 causes the leading edge of the film strip to enter the return chute structure 22. This is accomplished since the sharp edge of the member 56 forming one side of the return chute 22 is located in close proximity to the drum surface 52. And as air pressure in chamber 54 causes the leading edge of the film strip to move away from the drum, the member 56 guides it into the return chute 22. The adherence of the trailing portions of the film strip to the surface 52 of the drum assembly 18 causes the film strip to be driven into the return chute 22 until it reaches the platen assembly 30 which may be utilized to either create a vacuum or introduce an air pressure beneath the leading edge of the film strip. When a film strip is first introduced into the return chute 22, it is desired to arrest the leading edge of same just on the periphery of the inner cylindrical surface of the storage bin assembly 10, therefore, a vacuum is applied to line 58 thus introducing a vacuum in the plenum chamber 60. As will be understood, this vacuum causes the leading edge of the film strip entering the return chute 22 to be arrested when it crosses the holes 62 which enter the evacuated plenum chamber 60.

At this point it wil be seen that the system has placed a film strip within the return chute 22 with its leading edge adjacent to the holes 62 in the inner surface of the storage bin assembly. It will now be assumed that it is desired to transfer the film strip back into one of the storage chutes 14, as the armature 24 rotates past the opening of the return chute 22.

Referring now to the inner shoe assembly 28, it will be noted that a large plenum chamber 64 is provided having an input line 66. One side of this plenum chamber is provided with the member 68 which is again of a porous nature such as a sintered metal powder as is well known in the art which will cause a relatively uniform vacuum to be distributed across the surface of said member 68, which member forms part of the surface of inner shoe 28. The vacuum is supplied to the input line 66 through the vacuum manifold 80. Since this vacuum may be continuously applied to the inner shoe, it is not necessary to control application of this vacuum through a solenoid valve. Referring now to the plenum chamber 70 which opens directly on the surface of the inner shoe through a thin slot 70 formed by the chamber itself as illustrated, it will be noted that its feed line 72 is connected to both the vacuum manifold 80 through vacuum solenoid 82 and also to the pressure manifold 81 through pressure solenoid 84. The function of applying a pressure source to line 72 will be apparent from the subsequent description of a re-insertion or storage of a film strip from the inner shoe into the storage bin assembly 10. However, for the present discussion, the purpose of the vacuum supply through solenoid 82 will be described. When it is desired to return a strip waiting in return chute 22 to storage, it is necessary to very accurately position the strip on the inner shoe with respect to the leading edge of said inner shoe. This is accomplished through the application of a vacuum to the plenum chamber 70. Thus, as the armature 24 rotates to a position wherein the apertures 70 are aligned with the apertures 62 and thus, the leading edge of the strip in chute 22, a vacuum is simultaneously applied to the vacuum plenum chamber 70 on the armature 24 and a pressure is applied to the chamber 60 which causes the leading edge of the film strip in chute 22 to transfer to the rotating armature 24 and further, the adherence of the film strip to said armature is assured by the vacuum in chamber 70. Now as the armature 24 rotates, the film strip is drawn out of the chamber 22 and caused to adhere to the inner shoe due to the vacuum in the vacuum plenum 64.

Thus, to reiterate, the strip is now located on the surface of the inner shoe assembly 28 with the leading edge thereof over the plenum chamber 70. Assuming that it is now desired to transfer the strip on the inner shoe assembly 28 back into a storage chute 14 at a particular angular location of the armature assembly, a signal will cause the vacuum to be removed from line 72 in chamber 70 and a pressure to be applied to line 72 through the pressure solenoid 84 and into the plenum chamber 70 which will cause the leading edge of the strip to enter one of the storage chutes. The maintenance of the vacuum in the chamber 64 causes the remainder of the film to tend to adhere to the surface of the inner shoe 28, thus, as the armature continues to rotate, the film strip is, in effect, peeled off the inner shoe assembly and driven into the selected chute 14.

The positioning of the film within a chute is somewhat critical, i.e., the trailing edge should just be clear of the inner surface of the bin assembly 10 and the outer edge or leading edge should be just flush with the outer surface of the bin assembly 10. A braking means is provided to accomplish this, said means consists of the plenum chamber 90 located on the outer shoe assembly 26 having an input means 92 for supplying air pressure thereto. Pressure in the chamber 90 is transmitted to the outer surface of the bin assembly 10 through the porous member 94 embedded in the surface of the outer shoe assembly 26. The application of a pulse of air to the tube 92 from the pressure solenoid 86 applied at the proper moment as the film strip reaches its desired location in the shoe causes the inertia of the film strip to be overcome and very accurately positions same in the chute 14 so that it does not project beyond the outer surface of the storage bin assembly which might cause unnecessary physical wear on the leading edge of the film strip or might cause an inadvertent picking up of same by the vacuum chamber located in the leading edge of the outer shoe assembly 26.

It will be noted that the location of the braking plenum 90 on the outer shoe 26 will have a very specific relationship to the location of the plenum chamber 70 on the leading edge of the inner shoe assembly 28. This relationship is illustrated in the drawing by the angle $\beta$ which is the angle between the entrance and exit slots for any one of the storage chutes 14 and is also indicative of the angular relationship between the plenum chamber 90 on the outer chute 26 and the trailing edge of the plenum chamber 64 on the inner shoe 28. Further, the arcuate distance between the plenum chamber 70 and the trailing edge of the plenum chamber 64 is substantially equal to the length of one of the film strips. It is thus to be understood that the particular dimensions and angles shown in FIGURES 1 and 2 are not necessarily precise based on the specific length of the chutes shown due to the convenience in illustrating the assembly in the drawing; however, it should be borne in mind that the braking plenum chamber 90 on the trailing edge of the outer shoe 26 must line up with the proper exit slot for a storage chute 14 at the same time that a film strip arrives thereat. Similarly, the vacuum plenum 96 on the leading edge of the outer shoe 26 must be so related with respect to the plenum chamber 70 that they line up with the exit and entrance slots to the same storage chutes 14.

This latter relationship is necessary on the accessing operation since when air pressure is supplied to the chamber 70 through pressure solenoid 84, the openings 72 must be aligned with the entrance slot of chute 14 already having a film strip stored therein. This air pressure causes the film strip to be forced out of the opposite end of the chute 14 and thus to come in contact with the properly located porous surface member 98 over the vacuum plenum chamber 96. A vacuum is continuously supplied to the chamber 96 over line 100 during the entire time of traversal of said outer shoe 26 with the exception of the time when it is adjacent the read-write drum means which will be described subsequently. This vacuum is provided through the vacuum solenoid 83. This vacuum is sufficient to cause any film strip forced against the member 98 to adhere thereto, however, it is not sufficient to withdraw a film strip from a chute 14 unless a jet is concurrently supplied through the plenum 70 on the inner shoe. It is thus possible to maintain a vacuum in chamber 96 continuously with the exception of the time when the chamber is adjacent the surface 52 of the read-write assembly 18.

Thus, as the film strip is picked up by the member 98, it is drawn out of its storage chute 14 and supported between the outer shoe 26 and the outer surface of the storage bin 10 as the armature rotates around the storage bin 10. When the leading edge of the armature and thus the plenum chamber 96 is closest to the read-write assembly, the chamber 96 is momentarily connected to the pressurized air manifold 81 by means of the pressure solenoid 85 and simultaneously therewith the vacuum solenoid 83 is closed. This air pressure in the plenum chamber 96 causes the leading edge of the strip being carried by the outer shoe 26 to transfer to the surface 52 of the read-write drum assembly 18. It will be remembered that the inner portion 50 of the drum is evacuated and thus the film strip adheres tightly to the surface of the drum as it rotates. It should be noted at this time that the armature and the read-write drum assembly are driven from a common synchronous source such as, for example, the belt means illustrated in FIGURES 3 and 4, so that the peripheral speed of the drum assembly 18 very closely matches the peripheral speed of the armature with the result that the transition of the film strip from the armature to the drum assembly will be as smooth as possible thus eliminating any danger of damage to the film strip.

Figure 5:
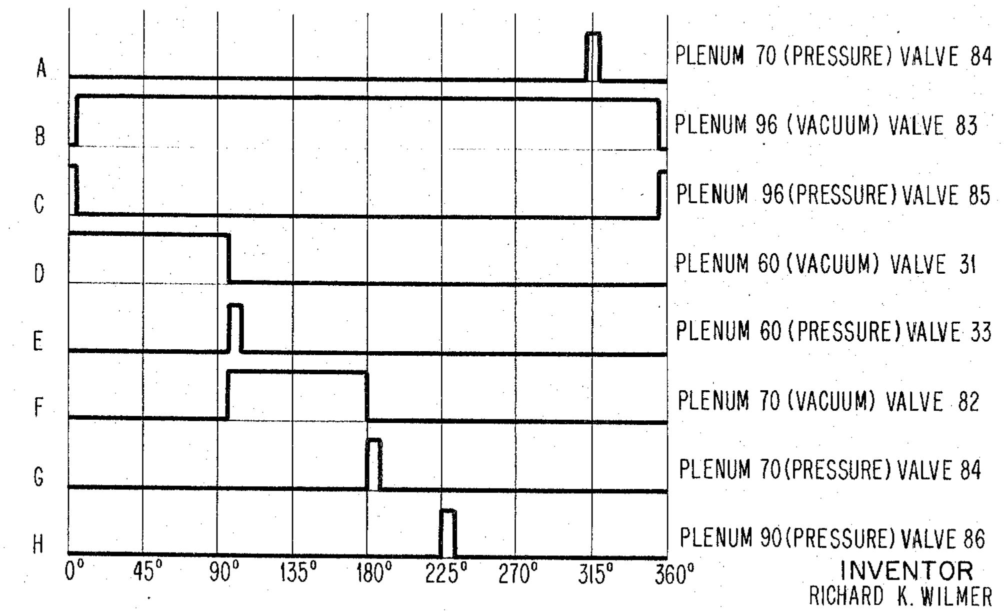
FIGURE 5 is a timing chart illustrating the timing of the pneumatic portions of the system.

An illustration of the timing necessary to energize the various pressure and vacuum solenoids will be pointed out with relationship to FIGURE 5. It will be noted that the assembly for actuating these solenoids would be slip rings 120 (FIGURE 3) mounted on the armature shaft having appropriate brushes 122. These energization pulses are transmitted to the slip rings through the brushes to energize the various solenoids connected thereto to access film strips, initiate the reading of same and return same to storage. One very well known type of timing apparatus is a contoured cam and contact assembly driven by the same synchronous motor means which is used to drive the armature and read-write drum. Thus, such operations as the application of an air pressure pulse to the chamber 96 and the removal of vacuum therefrom are always done at the zero shaft position as illustrated in FIGURE 5 and the provision of a pressurized air supply to the plenum chamber 60 and the member 30 would always be applied at an angle $\alpha$ as illustrated in FIGURE 2 relative to the zero position of the leading edge of the inner shoe assembly. The selection of a chute in which a film strip is to be stored or the selection of the chute from which a film strip is to be removed is under almost exclusive control of the plenum chamber 70 and its pressure valve 84, it being understood, of course, that during an accessing operation the vacuum solenoid 83 supplying vacuum to the plenum chamber 96 would have been energized previously by fixed timing means as will be apparent from FIGURE 5, curve B. Similarly, on a storage operation, the pressure valve 86 supplying pressure to the plenum chamber 90 would have to be energized at a precisely timed relationship with respect to the application of the pulse to the pressure solenoid 84 supplying pressure to plenum chamber 70.

It is obvious that such basic timing pulses may be obtained from either electromechanical means such as a set of fixed and movable cams as generally outlined above or by purely electronic means wherein the reference or zero angular position for timing occurrences for each cycle would be the angular position of the armature 24 when the leading edge of the plenum chamber 96 is just opposite the closest portion of the surface 52 of the drum assembly 18.

The mechanical details of the embodiment of the invention illustrated in FIGURES 1 and 2 are shown in FIGURES 3 and 4. Referring now to FIGURE 3, the details of the armature 24 are illustrated. This figure is a cross-section taken along the line 3—3 of FIGURE 2. All reference numerals in the figure are the same as in FIGURE 2 and all other figures. The operation of those portions of the device which have been previously described will not be repeated now. It will be noted that the armature 24 is carried on the shaft assembly 100 which is in turn journaled by suitable bearing means 102 in the cover member 12. The various thrust bearings and collars and the like necessary to suport the shaft in its illustrated vertical position are not specifically illustrated as such mechanical details are notoriously well known. It will be noted that above the cover 12 there is a pulley 106 keyed and affixed to the shaft assembly 100 and adapted to be driven by the belt member 108 which would be driven by the aforementioned synchronous motor means. The armature assembly 24 is similarly keyed and affixed to the upper portion of the shaft 100 above the supporting cover 12. It will be noted that there are two blind holes 110 and 112 provided in either end of the shaft assembly 100. It is through these holes that the vacuum and air pressure supplies are respectively supplied. The members 114 are rotary pneumatic coupling members well known in the art which are utilized for the purpose of supplying a pressure or a vacuum to a rotating shaft from a stationary member and are provided with necessary seals and bearing surfaces for accomplishing this purpose. Such assemblies are widely available in the art and form no part of the present invention. Vacuum introduced through the member 114 through the hole 110 enters the vacuum manifold 80 which is utilized to distribute the vacuum to the various plenums and vacuum solenoids requiring same. The connections of these are illustrated in FIGURE 2. The member 80 may either be a pipe provided with a plurality of fittings for supplying necessary vacuum to the various vacuum solenoids as shown or some other conveniently shaped member having a plurality of outlet points in a single input point.

Air pressure is supplied to the pressure manifold 81 through the rotary shaft seal 114 and shaft hole 112 in the same manner that vacuum is supplied to member 80. The member 81 is identical to the member 80 in that it may either be a simple piece of tubing with a plurality of fittings for connection to various pressure solenoids or a specially built member having a single input and a plurality of outlets as described above.

Slip rings 120 are shown mounted on the shaft 100 just above the rotary connector member 114. The brushes 122 supply suitable control pulses to these slip rings and the slip rings are in turn connected to the various vacuum and pressure solenoids mentioned previously and shown in FIGURE 2. The control signals applied through the brushes 122 would come from suitable control circuits previously mentioned but not specifically illustrated.

Thus, the means for mounting and driving the armature 24 as well as for supplying both air pressure and vacuum to the various plenum chambers located in the working surfaces of the inner and outer shoe members 26 and 28 have been described. As stated previously, while this structure constitutes an operating embodiment of the device, many mechanical variations could readily be made without departing from the spirit and scope of the invention.

Referring now to FIGURE 4, there is illustrated a typical embodiment of a read-write drum assembly 18 suitable for use with the present invention. It should be noted that while the invention is not specifically limited thereto, it is generally intended that the present assembly be used with a magnetic type of recording system, therefore, the read-write head 20 would be a magnetic read-write head having a plurality of heads, one for each track, which would appear on the tape such as is well known in the art. Referring now again to FIGURE 4, it will be noted that the read-write drum assembly is similarly supported in the cover member 12 for the storage bin as this is the only manner in which this member may be driven with the embodiment of the armature disclosed.

The reference numerals in FIGURE 4 similarly refer to the same elements as in the other figures. The actual read-write drum comprises the porous cylindrical member 52 defining a plenum chamber 50 therein which is provided with means for maintaining a vacuum. The whole read-write drum assembly 18 is suitably journaled by means 152 in the cover member 12 by suitable bearings, thrust washers and the like, the details of which form no part of the present invention and are accordingly not shown in detail. The drum is suitably secured to the rotatable hollow shaft 150 which is driven by a suitably keyed pulley 154 through a belt 156, which belt may be driven by a common motor means such as that used to drive the armature member 24. A vacuum is provided in the chamber 50 by means of the vacuum line 158 which is connected to a suitable vacuum source through a rotary seal member 114 similar to the ones illustrated in FIGURE 3 and through the hollow shaft 150 and the holes 160 in the shaft which open into the chamber 50. The top of the drum assembly is closed by the member 51 and the bottom of the rotatable drum assembly is formed by the stationary cover member 12. Any sort of suitable vacuum seal may be used between the drum and the cover 12, such for example, as the groove 162 and the felt washer 164 located in the bottom of said groove. This washer may be suitably lubricated with oil or grease and will provide a sufficient seal for the purposes of the present invention. Alternatively, an oiled O ring or some other type of well known sealing means may be utilized. The pressure chamber 54, which as stated previously performs the function of separating the leading edge of the film strip from the drum, is supplied from pressure line 55. This chamber is formed (referring again to FIGURE 2) by the member 57 which is rigidly supported on the cover member 12 and is thus stationary within the drum assembly so that it is always located just opposite the pointed portion of the member 56 and thus able to direct the leading edge of a film strip into the return chute 22. The air pressure from line 55 may be supplied by any suitable pressure source such as that described for any of the other pressure or vacuum plenum chambers. The timing of the introduction of the air pressure to the chamber 54 is not critical since the pressure will only be sufficient to cause the leading edge of the film to raise slightly. Thus, only the leading edge will be effected. Therefore, as soon as a reading or writing operation is terminated, the pressure may be supplied to the chamber 54 and as soon as a leading edge passes this member, it will be directed into the return chute 22. In the figure, the bottom 51 of the rotatable drum assembly is indicated as being located in a depression in the bottom member 19 of the bin assembly 10. However, it is to be understod that the bin assembly need not have a bottom extending into the area including the drum as it serves no specific functional purpose other than to impart added rigidity to this portion of the device. It is, of course, to be understood that the bottom 19 would of necessity have to be continuous underneath the return chute 22 and all of the actual storage chutes 14 in the assembly. As indicated previously, the bin assembly including the return chute and the member 56, etc., would preferably be constructed of a single injection molded piece of suitable plastic material as a single unit and the cover member 12 including the mounting means for the rotatable drum assembly 18 and rotatable armature assembly 24 would be a separate piece which would be fastened by suitable fastening members 15 to the bottom assembly. As stated previously, the top member 12 together with all of its associated structures must of necessity be supported from above by the support brackets 13.

All of the apparatus of the present invention illustrated in FIGURES 1 through 4 has now been described and functionally related. There will follow a brief description of a typical timing cycle of the various events during an access, a read-write and a return to storage operation. This description will be facilitated by referring to the timing charts of FIGURE 5. In this figure, it will be noted that the abscissa or X axis is marked in degrees of angular rotation of the armature 24 as this is the timing base upon which all of the timing events obviously must occur. The Y or ordinate displacement may be considered as indicating either a vacuum or pressure present in the particular plenum chamber to which the graph relates or conversely, to an electrical actuating signal applied to the particular solenoid valve actuated to provide such pressure or vacuum. It will be noted that a separate graph is provided for each of the relevent plenum chambers for which timing is critical.

Referring now specifically to FIGURE 5, an accessing operation will first be described. As stated previously, the zero angular position for all of the graphs will be that wherein the leading edge of the armature with the direction of rotation indicated is parallel with a line passing through the center line of the armature shaft and also the read-write drum. Also, as stated previously, a vacuum is maintained continuously in the plenum chamber 64 and also in the interior of the read-write drum means 50, therefore, it would serve no purpose to illustrate the timing for these two chambers in the timing chart as they have a vacuum applied thereto continuously.

Referring now specificaly to curves A and B of FIGURE 5, curve A is a graph illustrating a pulse of air pressure applied to the plenum chamber 70 by means of the pressure solenoid 84. For the purposes of this example, it is assumed that the aforesaid leading edge of the armature is at an angle of 315°, which would be a little in the counterclockwise direction from the position shown in FIGURE 2. Also, as stated previously, when the armature is in this position, it is known that there will be a storage chute entrance slot directly opposite the plenum chamber 70. As stated previously, this air pressure pulse causes the film strip to be ejected a short distance out of the slot and allows the leading edge of the outer shoe 26 to pick up the leading edge of the film strip. Referring to curve B, it will be noticed that at position 315° there is a vacuum in the plenum chamber 96. The next operation is that wherein the plenum chamber 96 is pulsed with a pressure pulse from the pressure solenoid 85. This pulse is illustrated in curve C and is seen to occur at the approximate zero or 360° position wherein the plenum chamber 96 is opposite the outer surface of the drum assembly 18 at their nearest point of proximity. This pulse, as explained previously, causes the leading edge of the film strip to transfer to the drum surface 52 and the vacuum which is continuously maintained in the drum causes the film to adhere tightly to the surface as the drum rotates. Thus, the timing for removing a film strip from the storage bin 10 and transferring same to the read-write drum assembly 18 has been described.

The next logical operation comprises stripping a film strip from the drum assembly 18 and transferring it to the return chute 22. As stated previously, a timing pulse may be applied to the pressure solenoid 51 at any time after a desired read-write operation has occurred and it is not necessary to time this pulse with the presence of the leading edge of the strip at the entrance to the return chute 22 as the air pressure in the chamber 54 will effect only the leading edge of the strip. Therefore, timing chart D illustrates the application of a vacuum to the plenum chamber 60 which is utilized to brake the strip entering the return chute 22. The timing of the application of this vacuum is similarly not critical, it only being necessary to apply a vacuum to the chamber 60 at approximately the same time a pressure is applied to the chamber 54 in the drum assembly 18. This is to ensure that the film strip entering the slot 22 is caused to stop at the proper position in the chute and not project out of the slot 22 into the path of the armature assembly. The critical timing at this point is the release of the vacuum in the plenum 60 and the application of a pressure thereto when the plenum 70 on the inner shoe arrives at said plenum. Curve D is the vacuum curve for the plenum chamber 60 and illustrates the vacuum as being applied at the zero degree level, however, it is to be understood that this vacuum might be applied either earlier or later. The curve shows the vacuum being released at a point slightly after 90° and pressure (see curve E) being applied at the same point in the form of a pulse and at the same time, vacuum being applied to plenum 70 (curve F). The application of the pressure to plenum 60 and vacuum to plenum 70 substantially simultaneously causes the leading edge of the film strip to transfer in a precise manner to the leading edge of the inner shoe assembly 28 which, as stated previously, is necessary for the proper and accurate returning of a film strip to its proper storage chute 14.

Thus, briefly recapitulating, the transfer of the film strip from the return chute 22 to the inner shoe of the armature 24 requires the removal of the vacuum from the plenum chamber 60 (curve E), the application of a pressure pulse to the plenum chamber 60 (curve E) and the application of a vacuum to the plenum chamber 70 on the inner shoe 28 of the armature (curve F).

Assume now that it is desired to store the film strip in a storage chute 14 which is accessible from the inner shoe when the armature is in a position 180° from the zero position. At this point, the vacuum in plenum 70 on the inner shoe is removed (curve F) and a pressure pulse is applied to this plenum chamber 70 at the 180° position as is apparent in curve G. As described previously, the pressure pulse applied to the plenum chamber 70 transfers the leading edge of the film strip to the storage chute 14 and the continued rotation of the armature causes the strip to be fed into the storage chute until at a predetermined time, i.e., angular displacement of the armature, it is known that the outer edge of the film strip has reached the outer surface of the bin assembly 10. At this point, which is shown to be approximately 45° in the chart in the exemplary embodiment of FIGURE 2, the plenum chamber 90 on the outer shoe assembly will be adjacent the outer exit slot for the appropriate storage chute 14 and at this time it is necessary to apply a pressure pulse to the plenum chamber 90, this pulse is clearly illustrated in curve H. Referring to the text material, to the right of curves A through H of FIGURE 5 there is an identification of the particular plenum chamber being supplied pressure or vacuum as well as the solenoid valve which is actuated to obtain the pressure or vacuum pulses indicated.

It may be seen from the above description of a typical cycle of operation of the invention that the present storage system provides for the very precise and rapid handling of the film strips such as it not possible with conventional mechanical machines requiring physical grasping or contacting of either the strip itself or of special sprocket holes and the like provided within the strips. Thus, the actual selection and clamping operations, i.e., of the film strip to the supporting members or the read-write means, is performed by pneumatic means and the actual motion or transporting of the film strip from storage to the read-write assembly and back by the physical or mechanical movement of the rotatable armature 24. As stated previously, it is quite important that the storage chutes merge with the outer surface of the bin assembly 10 at approximately tangent angles to allow the smooth withdrawal of the film strip from said slot and similarly, that the chutes merge with the inner cylindrical surface of the bin 10 in the same tangential manner to provide for the smooth transition of the strip from the inner shoe assembly into the storage chute. By incorporating this structure, relatively high speed operation of the present system may be accomplished with minimum wear to the film strips per se and minimal risk of the fouling of the system due to jamming of a strip in one of the storage chutes.

Although the principles of the present invention have been particularly pointed out and described with reference to the preferred embodiment thereof represented in the perspective drawing of FIGURE 1 and the detailed drawings of FIGURES 2 through 5, many modifications of the system disclosed could be made by a person skilled in the art without departing from the spirit and scope of the invention. For example, different mounting and drive configurations for both the rotatable armature 24 and the read-write drum assembly 18 could readily be achieved as well as other means for providing both the air pressure and vacuum sources to the system. Similarly, the actual construction of both the armature per se and the drum assembly could be changed considerably.

It should also be kept in mind that while the present invention has been directed specifically toward magnetic recording tapes which have been formed into the short film strips, other types of film strips are anticipated and could equally well be stored, accessed and read by the present system. For example, strips having information recorded thereon and readable therefrom by photo-responsive means such as punched tape and the like could be used. Similarly, deformation recording of some sort or electrostatic recording would also be possible utilizing the general storage and retrieval system taught by the invention.

While the invention has been particularly shown and described with reference to a preferred embodiment thereof, it will be understood by those skilled in the art that the above and other changes in form and details may be made therein without departing from the spirit and scope of the invention.

What is claimed is:

1. A storage bin for storing a plurality of flexible film strips including separate storage chute means for each such strip, said bin comprising:

a hollow substantially cylindrical member having inner and outer cylindrical surfaces radially spaced from each other, and a plurality of storage chutes located between said inner and outer cylindrical surfaces, each chute having an entrance slot lying in the inner cylindrical surface of said bin, each chute having an exit slot lying in the outer cylindrical surface of said bin, the inner and outer surfaces of said bin, in the areas adjacent to said entrance and exit slots, being unbroken except for said slots, each chute being substantially tangent to the outer cylindrical surface at its outer end and substantially tangent to the inner cylindrical surface at its inner end and, each chute being so shaped that a film strip entering and leaving said chute will traverse the inner and outer surfaces of the bin in the same relative direction.

2. A system for storing a plurality of flexible film strips which comprises:

a hollow substantially cylindrical storage bin means having inner and outer cylindrical surfaces, a plurality of individual film strip storage chutes located between said inner and outer cylindrical surfaces, first rotary means mounted adjacent said outer cylindrical surface operative to transport a film strip from a selected storage chute in said bin means to a read-write means, said read-write means located substantially tangent to and within said outer cylindrical surface for accepting a film strip from said first rotary means, and second rotary means mounted adjacent said inner cylindrical surface for transporting a film strip from said read-write means back to a storage chute.

3. A film strip storage system as set forth in claim 2 wherein said first and second rotary means are located on a single rotary armature means and comprise:

an outer and inner shoe respectively having surfaces thereon adapted to move in close proximity to said outer and inner cylindrical surfaces of said storage bin means.

4. A film strip storage system as set forth in claim 3 including:

means rotatably mounting said read-write means, means mounting the rotary armature means coaxially with said storage bin means, and means for rotatably driving said armature means and said read-write means.

5. A film strip storage system as set forth in claim 4 above including:

pneumatic means mounted on said inner shoe for moving a selected film strip out of a selected storage chute so that it may be picked up by said outer shoe and for returning such strip from the inner shoe to a storage chute.

6. A film strip storage system as set forth in claim 5 including:

pneumatic means mounted on said outer shoe to impart the mechanical motion of the rotary armature means to a film strip and thus mechanically transport same from a storage chute to the read-write means and subsequently back to a storage chute.

7. A film strip storage system as set forth in claim 6 wherein said read-write means comprises:

a rotatable drum having an axis parallel to the axes of said storage bin means and said armature means, and pneumatic means on said rotatable drum for clamping a film strip on the surface of said drum and for subsequently releasing a film strip from said drum.

8. A film strip storage system as set forth in claim 7 wherein the aforesaid pneumatic means are supplied from suitable vacuum and pressurized air sources through electrically actuated solenoid valves.

9. A film strip storage system as set forth in claim 2 wherein the outer ends of said individual storage chutes are substantially tangent to the outer cylindrical surface of said storage bin and the inner ends thereof are substantially tangent to the inner cylindrical surface of said storage bin.

10. A film strip storage system comprising:

storage bin means having a plurality of individual strip storage chutes therein, said bin means being of substantially arcuate shape wherein the inner and outer ends of said storage chutes define slots and lie within inner and outer concentric cylindrical surfaces respectively, said storage chutes being curved so that the chute is substantially tangent to the outer cylindrical surface of said storage bin means at its outer end and substantially tangent to the inner cylindrical surface of said storage bin means at its inner end, outer shoe means rotatably mounted with respect to said bin means and adapted to rotate adjacent to the outer cylindrical surface of said bin means, means for pneumatically removing a selected strip from said bin means upon command and for affixing said strip to said outer shoe means for transport around the outer periphery of said storage bin means, read-write drum means located substantially tangent to an extension of the outer cylindrical surface of said storage bin means, means provided to transfer said strip from said outer shoe means to said read-write drum means, a return chute located between said read-write drum means and said inner cylindrical surface of said arcuate storage bin means, means for effecting the transfer of a strip from said read-write drum means to said return chute, inner rotary shoe means adapted for rotation within said storage bin means adjacent said inner cylindrical surface, means for extracting a film strip from said return chute including:

a vacuum platen on said inner rotary shoe means, and means for transferring said film strip to a selected input opening of a selected storage chute.

11. A film strip storage system as set forth in claim 10 wherein said storage bin means is discontinuous, the read-write drum means is located in the discontinuous portion such that it lies between the extensions of said inner and outer cylindrical surfaces and said return chute has an entrance slot lying at a point adjacent the surface of said read-write drum means and an exit slot in an extension of said inner cylindrical surface.

12. A film strip storage system as set forth in claim 11 wherein the inner and outer shoe means are fixedly mounted on a common rotatable armature means and are mounted coaxially with respect to said storage bin means, each of said shoe means being at least as long as a film strip, said inner and outer shoe means having pneumatic means mounted in the surfaces thereof cooperable with each other to select a particular film strip and remove same from a given storage chute and for subsequently returning a film strip to its storage chute and stopping same in the proper position within said chute.

13. A film strip storage system as set forth in claim 12 including:

pneumatic means for maintaining a film strip in contact with said read-write drum means, pneumatic means for subsequently transferring the strip to said return chute, and pneumatic means for stopping said film strip at the proper location in said return chute.

14. A film strip storage system as set forth in claim 13 wherein the means for supplying air pressure and vacuum to said plurality of pneumatic means comprises:

electric solenoid valve means energized by suitable timing means to cause pressure or vacuum to be supplied to a desired pneumatic means.

15. A film strip storage system as set forth in claim 14 including:

means for maintaining the speed of the surface of said read-write drum means and the outer shoe means substantially equal in order that a smooth transition of the film strip from said outer shoe means to said read-write drum means will occur.

References Cited by the Examiner

UNITED STATES PATENTS

| | | | |
|---|---|---|---|
| 57,963 | 9/1866 | Platt | 211—41 |
| 2,338,180 | 1/1944 | Harrison | 346—48 |

FOREIGN PATENTS

| | | |
|---|---|---|
| 187,094 | 1/1964 | Sweden. |

ROBERT B. REEVES, *Primary Examiner.*

KENNETH N. LEIMER, *Examiner.*